No. 686,298. Patented Nov. 12, 1901.
O. HOFFMANN.
WHEELBARROW.
(Application filed Apr. 20, 1901.)
(No Model.)
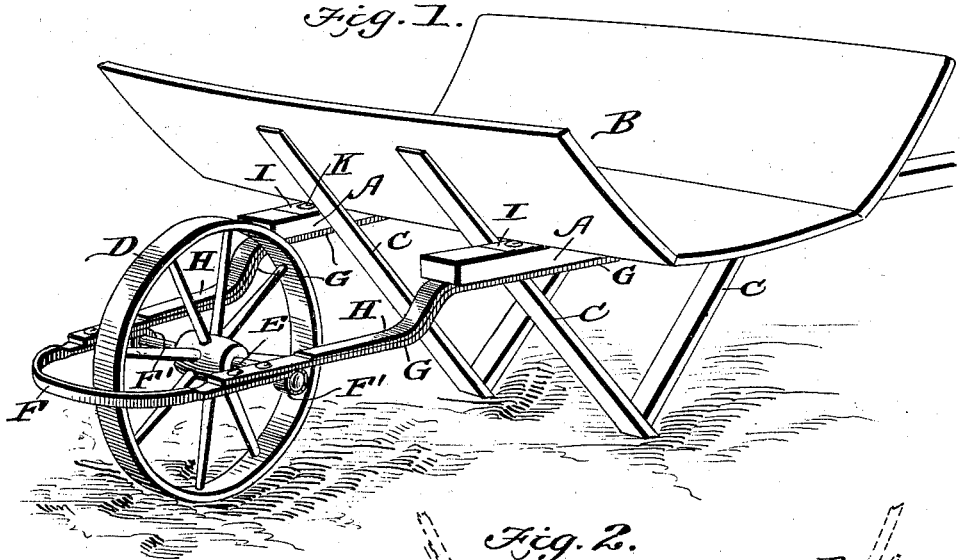
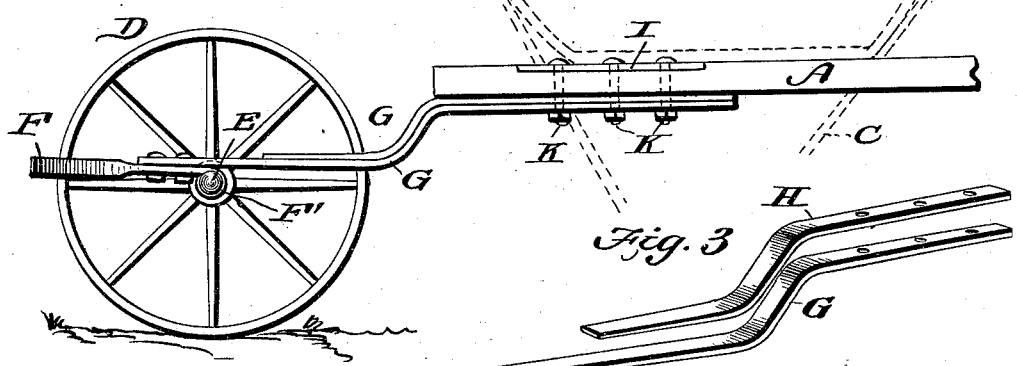
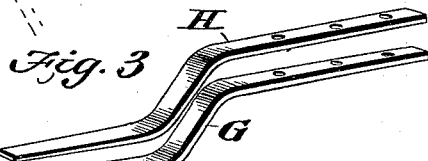
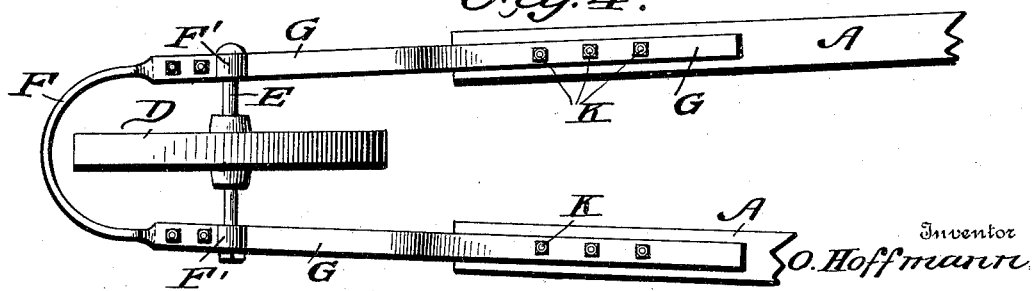
Witnesses
Inventor
O. Hoffmann
By
Attorneys

UNITED STATES PATENT OFFICE.

OTTO HOFFMANN, OF PORTLAND, OREGON.

WHEELBARROW.

SPECIFICATION forming part of Letters Patent No. 686,298, dated November 12, 1901.

Application filed April 20, 1901. Serial No. 56,723. (No model.)

*To all whom it may concern:*

Be it known that I, OTTO HOFFMANN, a citizen of the United States, residing at Portland, in the county of Multnomah and State of Oregon, have invented a new and useful Wheelbarrow-Spring, of which the following is a specification.

This invention relates generally to wheelbarrows, and more particularly to an improved means of connecting the wheel to the frame, the object of the invention being to provide a simple and efficient spring attachment by means of which the jar incident to traveling over a rough road will be greatly avoided.

Another object is to provide an exceedingly cheap and simple attachment by means of which the various parts of the wheelbarrow can be quickly and easily assembled.

With these objects in view the invention consists in the peculiar construction of the various parts and their novel combination and arrangement, all of which will be hereinafter fully described, and pointed out in the claims.

In the drawings forming part of this specification, Figure 1 is a perspective view of a wheelbarrow constructed in accordance with my invention. Fig. 2 is a side view showing the spring attachment. Fig. 3 is a detail view showing the spring connections detached; and Fig. 4 is a bottom plan view of the spring-frame, showing the manner of connecting the same to the wooden beams.

In carrying out my invention I employ the wooden beams A, which are tapered at their rear ends to provide suitable handles. The body of the barrow proper, B, is supported by these beams through the medium of the inclined supports or standards C, which are securely fastened to the side beams A.

The wheel D is mounted upon an axle E, which is journaled in the ends of a bow-shaped frame F, the ends of said frame being carried around, as shown at F', to provide bearings for the ends of the wheel-axle. This bow-shaped frame F extends around in front of the wheel and acts as a guard to protect said wheel. The frame F, in which the wheel is journaled, is connected to the side beams A by means of a spring-bar G, which is secured to the side beam A upon the under side adjacent to the forward end and projects horizontally some distance beyond said end and is then curved downwardly, the extreme end of the said bar being fastened to the side member of the frame F at a point in advance of the wheel-axle, and it will of course be understood that there are two such bars G, one extending from each side beam A to each side member of the frame F.

Each spring-bar G is reinforced by means of a flat leaf-spring H, which is arranged above the bar G and is secured at its rear end to the under side of the beam A and by means of the same bolts which secure the side bar G. This side bar H extends substantially parallel with the bar G, but terminates a short distance to the rear of the wheel-axle. The purpose of this supplemental spring H is to reinforce the spring-bar G, and by being interposed between the said bar and the beam A it will better serve to take up the jar incidental to the passage over rough ground.

A washer-plate I is set into the upper surface of each side beam and through which the fastening-bolts K pass, said washer-plate serving to prevent the bolts working loose.

By journaling the wheel in the bow-shaped frame and connecting said frame to the wheelbarrow-frame by means of the spring-bar, which is reinforced by a supplemental spring, it will be readily understood that the jar incidental to the travel over rough ground will be greatly avoided, and by having the wheel arranged in a bow-shaped frame the forward portion of said frame will serve as a guard to protect the said wheel.

Having thus fully described my invention, what I claim as new, and desire to secure by Letters Patent of the United States, is—

1. The combination with the side beams, of the wheel, the bow-shaped frame in which the wheel is journaled, the spring side bars connecting the bow-shaped frame to the side beams, and the reinforcing-spring arranged upon the spring-bar and terminating at a point to the rear of the wheel-axle, substantially as shown and described.

2. The combination with the side beams, of the spring-bars attached to the under sides thereof and projecting forwardly beyond the ends of the side beams, the reinforcing-springs arranged upon the spring-bars, the bow-shaped frame having its ends formed into
5 bearings, the axle journaled therein, and the wheel mounted upon the axle, the forward ends of the spring-bars being connected to the bow-shaped frame in advance of the wheel-axle, substantially as shown and described.

OTTO HOFFMANN.

Witnesses:
M. MATCOVICH,
FRANK S. GRANT.